(12) United States Patent
Takahashi et al.

(10) Patent No.: US 8,838,662 B2
(45) Date of Patent: Sep. 16, 2014

(54) CONNECTION INFORMATION GENERATING APPARATUS AND CONTROLLING METHOD

(75) Inventors: Takuji Takahashi, Kawasaki (JP); Koji Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 13/361,948

(22) Filed: Jan. 31, 2012

(65) Prior Publication Data

US 2012/0239718 A1 Sep. 20, 2012

(30) Foreign Application Priority Data

Mar. 16, 2011 (JP) .................................. 2011-058563

(51) Int. Cl.
*G06F 7/72* (2006.01)
*H04L 12/64* (2006.01)

(52) U.S. Cl.
CPC ................. *H04L 12/6402* (2013.01)
USPC ......................................................... 708/492

(58) Field of Classification Search
None
See application file for complete search history.

(56) References Cited

U.S. PATENT DOCUMENTS

| | | | |
|---|---|---|---|
| 5,185,711 A * | 2/1993 | Hattori ........................... | 708/492 |
| 5,642,349 A | 6/1997 | Cloonan et al. | |
| 5,687,172 A | 11/1997 | Cloonan et al. | |
| 6,766,345 B2 | 7/2004 | Stein et al. | |
| 7,568,063 B2 | 7/2009 | Gostin et al. | |
| 8,589,466 B2 * | 11/2013 | Lablans ........................ | 708/493 |
| 2007/0110229 A1* | 5/2007 | Lablans ........................... | 380/28 |
| 2011/0170697 A1* | 7/2011 | Lablans ........................ | 380/287 |
| 2012/0239718 A1* | 9/2012 | Takahashi et al. ............ | 708/492 |

FOREIGN PATENT DOCUMENTS

| | | |
|---|---|---|
| EP | 0720413 B1 | 3/2004 |
| EP | 2192787 | 6/2010 |
| JP | 8-251235 A | 9/1996 |
| JP | 2005-512183 A | 4/2005 |
| JP | 2007-220100 A | 8/2007 |
| JP | 2010-186129 A | 8/2010 |

OTHER PUBLICATIONS

"Extended European Search Report (EESR)" for corresponding European Patent Application No. 12153037.2 and mailed by EPO on Apr. 12, 2012.
C. Grabbe et al., "A High Performance VLIW Processor for Finite Field Arithmetic", Proceedings of the International Parallel and Distributed Processing Symposium, IEEE, Apr. 22, 2003.
L. Yu et al., "Practical Network Coding Approach for Multicast Packet Switching", IEEE, Jun. 23, 2009.
Japanese Office Action mailed Jul. 22, 2014 for corresponding Japanese Patent Application 2011-058563, with English Translation, 6 pages.

* cited by examiner

*Primary Examiner* — David H Malzahn
(74) *Attorney, Agent, or Firm* — Fujitsu Patent Center

(57) ABSTRACT

A connection information generating apparatus that generates connection information that indicates connections between a plurality of first transferring devices and a plurality of second transferring devices. The connection information generating apparatus includes a creating unit that creates an addition table and a multiplication table in a Galois field that has a characteristic of a value based on a number of the second transferring devices that are connected to each of the first transferring devices. The connection information generating apparatus includes a generating unit that generates connection information defining groups of first transferring devices to be connected to each of the second transferring devices, in accordance with the multiplication table and the addition table created by the creating unit.

9 Claims, 13 Drawing Sheets

FIG.2

|   | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

FIG.3

|   | 0 | 1 | 2 | 3 | 4 |
|---|---|---|---|---|---|
| 0 | 0 | 1 | 2 | 3 | 4 |
| 1 | 1 | 2 | 3 | 4 | 0 |
| 2 | 2 | 3 | 4 | 0 | 1 |
| 3 | 3 | 4 | 0 | 1 | 2 |
| 4 | 4 | 0 | 1 | 2 | 3 |

FIG.4

| | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 5 | 6 | 7 |
| 2 | 0 | 2 | 4 | 6 | 3 | 1 | 7 | 5 |
| 3 | 0 | 3 | 6 | 5 | 7 | 4 | 1 | 2 |
| 4 | 0 | 4 | 3 | 7 | 6 | 2 | 5 | 1 |
| 5 | 0 | 5 | 1 | 4 | 2 | 7 | 3 | 6 |
| 6 | 0 | 6 | 7 | 1 | 5 | 3 | 2 | 4 |
| 7 | 0 | 7 | 5 | 2 | 1 | 6 | 4 | 3 |

FIG.5

| | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

|    | 0 | 1 | 2 | 3 | 4 | 5 | 6 | 7 | 8 | 9 | 10 | 11 | 12 | 13 | 14 | 15 | 16 | 17 |
|----|---|---|---|---|---|---|---|---|---|---|----|----|----|----|----|----|----|----|
| 0  | O |   |   | O |   |   | O |   |   | O |    |    | O  |    |    | O  |    |    |
| 1  |   |   | O |   |   | O |   |   | O |   |    | O  |    |    | O  |    |    | O  |
| 2  |   | O |   |   | O |   |   | O |   |   | O  |    |    | O  |    |    | O  |    |
| 3  | O |   |   |   | O |   |   |   | O | O |    |    |    | O  |    |    |    | O  |
| 4  |   |   | O | O |   |   |   | O |   |   |    | O  | O  |    |    |    | O  |    |
| 5  |   | O |   |   |   | O | O |   |   |   | O  |    |    |    | O  | O  |    |    |
| 6  | O |   |   |   |   | O |   | O |   | O |    |    |    |    | O  |    | O  |    |
| 7  |   |   | O |   | O |   | O |   |   |   |    | O  |    | O  |    | O  |    |    |
| 8  |   | O |   | O |   |   |   |   | O |   | O  |    | O  |    |    |    |    | O  |
| 9  | O | O | O |   |   |   |   |   |   | O | O  | O  |    |    |    |    |    |    |
| 10 |   |   |   |   | O | O | O |   |   |   |    |    | O  | O  | O  |    |    |    |
| 11 |   |   |   |   |   |   | O | O | O |   |    |    |    |    |    | O  | O  | O  |

FIG.9

|   | 0 | 1 |
|---|---|---|
| 0 | 0 | 0 |
| 1 | 0 | 1 |

(with dashed cells showing 0 above and 1 to the left)

FIG.10

|   | 0 | 1 |
|---|---|---|
| 0 | 0 | 1 |
| 1 | 1 | 0 |

FIG.11

|   | 0 | 1 | 2 | 3 | 4 | 5 | 6 |
|---|---|---|---|---|---|---|---|
| 0 | O |   | O |   | O |   |   |
| 1 |   | O |   | O | O |   |   |
| 2 | O |   |   | O |   | O |   |
| 3 |   | O | O |   |   | O |   |
| 4 | O | O |   |   |   |   | O |
| 5 |   |   | O | O |   |   | O |
| 6 |   |   |   |   | O | O | O | ated by a connection table creating unit according to the first embodiment when p=6 and q=5;

CONNECTION INFORMATION GENERATING APPARATUS AND CONTROLLING METHOD

CROSS-REFERENCE TO RELATED APPLICATION

This application is based upon and claims the benefit of priority of the prior Japanese Patent Application No. 2011-058563, filed on Mar. 16, 2011, the entire contents of which are incorporated herein by reference.

FIELD

The embodiments discussed herein are directed to a connection information generating apparatus, a controlling method, and a controlling program.

BACKGROUND

When communications are conducted simultaneously among multiple nodes, a non-blocking network technology that ensures communication paths to cause no conflict among them has been used. Examples of such a technology include a non-blocking 3-stage Clos network, in which every communication between any pair of nodes is conducted through three intermediate transferring devices.

FIG. 18 is a diagram for explaining an example of the non-blocking 3-stage Clos network. A network 80 illustrated in FIG. 18 includes six nodes 81 to 86, switches 87 to 89 that serve as the first or third transferring devices, and crossbar switches (hereinafter, "XB's") 90 to 92 that serve as the second transferring devices.

In the network 80, each of the switches 87 to 89 is mutually connected to each of the XB's 90 to 92, and each of the switches 87 to 89 is connected to two nodes. For the nodes, computers that form a cluster, network devices that are connected to an external network, or the likes are deployed.

To establish a new communication between a pair of nodes, the switches 87 to 89 of this network 80 execute a dynamic routing process including arbitration to select an XB that is not relaying any other communication to ensure that communication path do not cause conflict with others. More specifically, the switches 87 to 89 select an XB that is not used for any other communication either by a switch connected to the transmission node or by a switch connected to the reception node. Then, the switches 87 to 89 use the selected XB to relay the new communication between the nodes.

For example, when the node 81 and the node 86 are starting communications, the switch 87 searches for an XB that is not used for the communications either by itself or by the switch 89 connected to the node 86. When the XB 91 is not used for communication by either the switch 87 or the switch 89, the switch 87 selects the XB 91. Thereafter, the switch 87 uses the XB 91 to relay the communication between the node 81 and the node 86.

However, with the technology of connecting the switches and the XB to each other, when a new communication is to be established between some nodes, a dynamic routing process that involves arbitration is executed to avoid conflict among communication paths. As a result, when the delay allowed in communications between nodes is very short, overhead caused by the arbitration is not negligible.

This arbitration-related overhead may be reduced by reducing the number of nodes connected to each switch. However, to constitute a non-blocking network by reducing the number of nodes connected to each switch while maintaining the total number of nodes, it demands a large-scale XB to fully connect a large number of switches. An XB is usually realized by a large scale integrated circuit (LSI), and hence the XB needs a large number of pins to connect a large number of switches.

When a large-scale XB is not available, a non-blocking 3-stage Clos network may be deployed in place of an XB in the network. However, in such a network, a dynamic routing process that involves arbitration still has to be executed in the non-blocking 3-stage Clos network provided in place of the XB, and therefore overhead caused by the arbitration is not suppressed.

The technology disclosed herein resolves the problem of the dynamic routing process that involves arbitration, and reduces the arbitration-related overhead.

SUMMARY

According to an aspect of an embodiment of the invention, a connection information generating apparatus that generates connection information that indicates connections between a plurality of first transferring devices and a plurality of second transferring devices. The connection information generating apparatus includes a creating unit that creates an addition table and a multiplication table in a Galois field that has a characteristic of a value based on a number of the second transferring devices that are connected to each of the first transferring devices. The connection information generating apparatus includes a generating unit that generates connection information defining groups of first transferring devices to be connected to each of the second transferring devices, in accordance with the multiplication table and the addition table created by the creating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram for explaining a multiplication table for GF(5);

FIG. 3 is a diagram for explaining an addition table for GF(5);

FIG. 4 is a diagram for explaining a multiplication table for GF(8);

FIG. 5 is a diagram for explaining an addition table for GF(8);

FIG. 6 is a diagram for explaining a connection table when p=q=6;

FIG. 7 is a diagram for explaining a connection table created by a connection table creating unit according to the first embodiment when p=6 and q=5;

FIG. 8 is a diagram for explaining a connection table when p=4 and q=6;

FIG. 9 is a diagram for explaining a multiplication table for GF(2);

FIG. 10 is a diagram for explaining an addition table for GF(2);

FIG. 11 is a diagram for explaining a connection table when p=q=3;

DESCRIPTION OF EMBODIMENTS

Preferred embodiments of the present invention will be explained with reference to accompanying drawings.

[a] First Embodiment

An example of a connection information generating apparatus is explained in the first embodiment. For example, the connection information generating apparatus creates a connection table that indicates connections between multiple fan-out switches (FO's) to each of which a node is connected and crossbar switches (XB's) that relay communications between the FO's.

Figure 1:
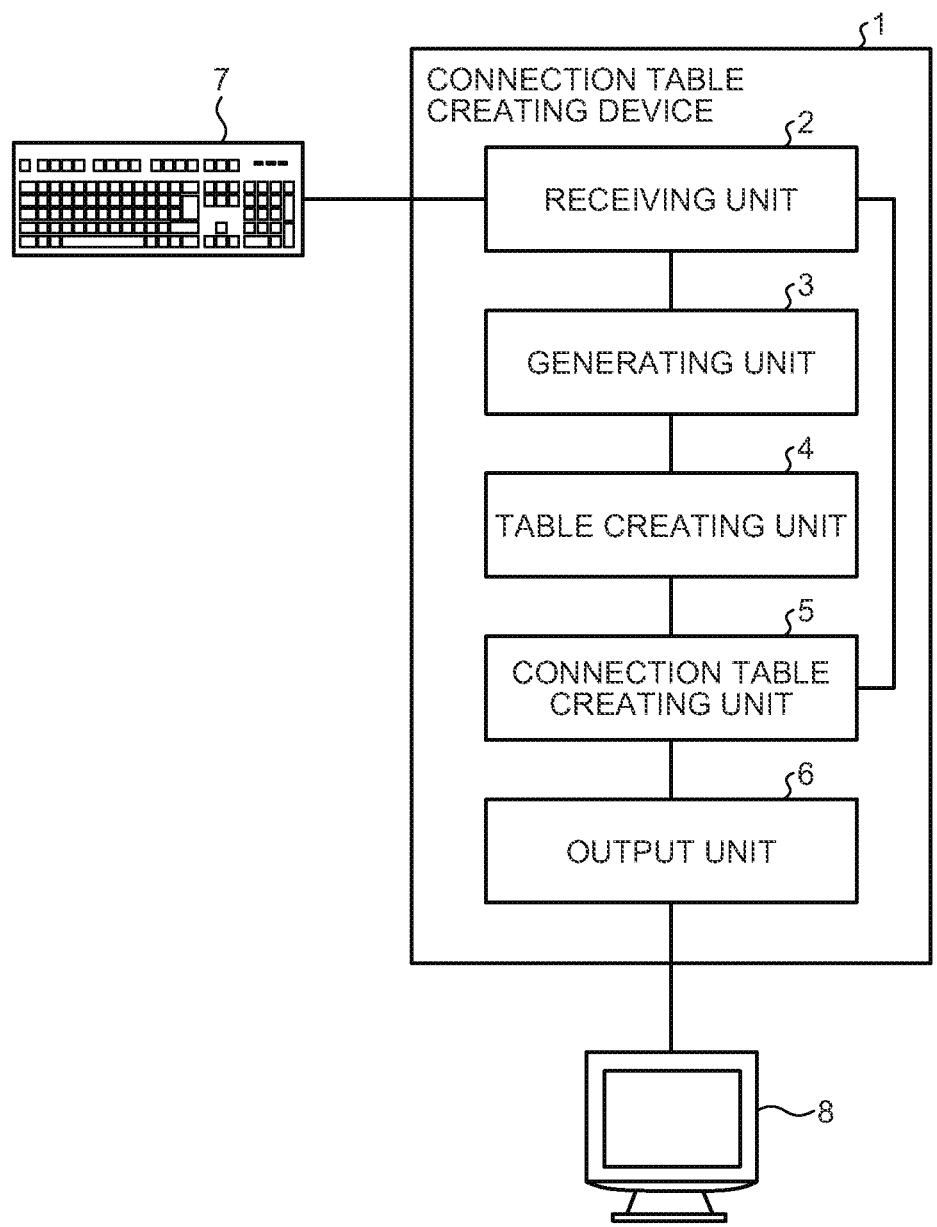
FIG. 1 is a diagram for explaining a connection table creating device.

FIG. 1 is a diagram for explaining an example of the connection table creating device. As illustrated in FIG. 1, a connection table creating device 1 includes a receiving unit 2, a generating unit 3, a table creating unit 4, a connection table creating unit 5, and an output unit 6. Furthermore, the receiving unit 2 of the connection table creating device 1 is connected to a keyboard 7 to receive numerical inputs designated by the user, as explained later. In addition, the output unit 6 of the connection table creating device 1 is connected to a monitor 8 so that a connection table created in accordance with the numerical values designated by the user can be displayed on the monitor 8.

The connection table creating device 1 acquires, the number p of XB's that can be connected to each FO and the number q of FO's that can be connected to each of the XB's, which are input by the user by way of an input device such as the keyboard 7. Then, the connection table creating device 1 creates a connection table for multiple FO's and multiple XB's, based on the p and q that are input, and displays the created connection table onto the monitor 8.

The process in which the connection table creating device 1 creates a connection table by using the units 2 to 6 is now explained in detail. First, the receiving unit 2 acquires the number p of XB's that can be connected to each FO and the number q of FO's that can be connected to each of the XB's, which are input by the user by way of the keyboard 7. Because one node is connected to each FO, p is the number obtained by subtracting 1, which is the number of port for the node connection, from the number of ports of each FO, while q is the number of ports of each XB. That is to say, the receiving unit 2 acquires the number q of ports of an XB and a value p obtained by subtracting 1 from the number of ports of an FO, which are the numbers that the user can prepare for establishing a network.

Then, the receiving unit 2 calculates the prime number P, the natural number N, and the natural number c that satisfy $p=P^N+1$, $q=cp$, or $q=c(p-1)$, based on the acquired values p and q. Thereafter, the receiving unit 2 notifies the generating unit 3 of P and N, and notifies the connection table creating unit 5 of p, q, P, N, and c.

Moreover, if there is no prime number P, natural number N, or integer c that satisfy $p=P^N+1$, $q=cp$, or $q=c(p-1)$, the receiving unit 2 executes the following process. That is, the receiving unit 2 calculates the prime number P, the natural number N, and the integer c that satisfy $p'=P^N+1$, $q'=cp'$, or $q'=c(p'-1)$, where p' and q' are defined as $p'\leq p$ and $q'\leq q$. Then, the receiving unit 2 notifies the generating unit 3 of P and N, and notifies the connection table creating unit 5 of p, q, P, N, and c, where p' is regarded as p and q' is regarded as q.

Based on the prime number P and the natural number N that are calculated from p and q input by the user, the generating unit 3 generates the Nth polynomial f(X) over the Galois field GF(P), in which the prime number P serves as a characteristic, in such a manner that the polynomial becomes irreducible over GF(P). Then, the generating unit 3 notifies the table creating unit 4 of the generated polynomial f(X).

More specifically, the generating unit 3 generates Equation (1) from the prime number P and the natural number N. Here, $A_i$ (i=0 to N−1) in Equation (1) is a coefficient that satisfies $0 \leq A_i < P$.

$$f(X) = X^N + A_{N-1} \times X^{N-1} + \ldots + A_1 \times X + A_0 \quad (1)$$

Here, f(X) being irreducible over GF(P) means that f(X) does not have any first-order or higher polynomials a(X) and b(X) that satisfy Equation (2).

$$f(X) = a(X) \times b(X) \bmod P \quad (2)$$

First, the generating unit 3 creates a list of the Nth polynomials over GF(P). Next, it generates all the polynomials over GF(P) in which the order is 1 to N−1, and eliminates all the Nth polynomials that are expressed by the product of the generated polynomials from the created list. Then, the generating unit 3 notifies the table creating unit 4 of one of the Nth polynomials remaining on the list as the Nth irreducible polynomial f(X). At least one f(X) that is not irreducible exists with respect to a prime number P and a natural number N.

The table creating unit 4 creates an addition table and a multiplication table for the Galois field GF($P^N$) from a set of polynomials of the N−1 order or lower over GF(P) by applying the Nth irreducible polynomial f(X) notified by the generating unit 3 as a modulus. In other words, the table creating unit 4 creates an addition table and a multiplication table for the Galois field in which the value $P^N$ that is obtained based on the value p input by the user serves as a characteristic.

Hereinafter, the process in which the table creating unit 4 creates an addition table and a multiplication table where Q=$P^N$ is explained in detail. First, an integer j that satisfies $0 \leq j < Q$ can be expressed by Equation (3). Here, $B_i$ (i=0 to N−1) in Equation (3) is a coefficient that satisfies $0 \leq B_i < P$, and is a digit of the P-adic expression of j.

$$j = B_{N-1} \times P^{N-1} + B_{N-2} \times P^{N-2} + \ldots + B_1 \times P + B_0 \quad (3)$$

In the same manner as Equation (3), all the polynomials of the N−1 order or lower over GF(P) are given in Equation (4) as g(0, X) to g(Q−1, X). Here, g(j, P)=j holds.

$$g(j, X) = B_{N-1} \times X^{N-1} + B_{N-2} \times X^{N-2} + \ldots + B_1 \times X + B_0 \quad (4)$$

The table creating unit 4 creates an addition table of GF(Q) for all the combinations of g(0, X) to g(Q−1, X) by applying addition defined by Equation (5). Here, the symbol |+| in Equation 5 represents addition that gives a polynomial over GF(P), which is a remainder obtained when dividing the sum of g(i, X) and g(j, X) by P.

$$g(i, X) |+| g(j, X) = g(i, X) + g(j, X) \bmod P \quad (5)$$

In other words, the table creating unit 4 applies the addition defined by Equation (5) to all the combinations of g(0, X) to g(Q−1, X), and creates an addition table that illustrates integers obtained by substituting X=P into a polynomial applied addition of Equation (5).

Furthermore, the table creating unit 4 applies the multiplication defined by Equation (6) to all the combinations of g(0, X) to g(Q−1, X) to create a multiplication table for GF(Q). In Equation (6), the symbol |×| represents multiplication that gives a polynomial over GF(P), which is a remainder obtained by dividing the product of g(i, X) and g(j, X) by f(X) and further dividing the remainder thereof by P.

$$g(i,X)|\times|g(j,X)=(g(i,X)\times g(j,X) \bmod f(X)) \bmod P \quad (6)$$

In other words, the table creating unit 4 applies the multiplication defined by Equation (6) to all the combinations of g(0, X) to g(Q−1, X), and creates a multiplication table that illustrates integers obtained by substituting X=P into the polynomial applied multiplication of Equation (6). Thereafter, the table creating unit 4 sends the created addition table and multiplication table to the connection table creating unit 5.

FIG. 2 is a diagram for explaining the multiplication table for GF(5). FIG. 3 is a diagram for explaining an addition table for GF(5). In the tables of FIGS. 2 and 3, the dotted-lined areas indicate row and column numbers of the solid-lined cells.

For example, when the user inputs p=q=6, the table creating unit 4 creates a multiplication table for GF(5) as illustrated in FIG. 2, and sends the created multiplication table to the connection table creating unit 5. Moreover, when the user inputs p=q=6, the table creating unit 4 creates an addition table for GF(5) as illustrated in FIG. 3, and sends the created addition table to the connection table creating unit 5.

Each cell in the multiplication table for GF(5) of FIG. 2 includes a remainder left when the product of the row number between 0 and 4 of the cell and the column number between 0 and 4 of the cell is divided by the characteristic of 5 for GF(5). In addition, each one the remainders 0, 1, 2, 3, and 4 that can be obtained when any integer is divided by 5, the characteristic of GF(5), is included in every row and every column of the multiplication table except for the row 0 and the column 0, as indicated in FIG. 2.

Moreover, each cell in the addition table for GF(5) in FIG. 3 includes a remainder left when the sum of the row number between 0 and 4 of the cell and the column number between 0 and 4 of the cell is divided by the characteristic of 5 for GF(5). Further, as indicated in FIG. 3, each one of the remainders 0, 1, 2, 3, and 4 that can be obtained when any integer is divided by 5, the characteristic of GF(5), is included in every row and every column of the addition table.

FIG. 4 is a diagram for explaining a multiplication table for GF(8). Further, FIG. 5 is a diagram for explaining an addition table for GF(8). In the tables of FIGS. 4 and 5, the dotted-lined areas indicate row and column numbers of the solid-lined cells.

For example, when the user inputs p=q=9, the table creating unit 4 creates a multiplication table for GF(8) whose characteristic is 8, as illustrated in FIG. 4, and sends the created multiplication table to the connection table creating unit 5. Furthermore, when the user inputs p=q=9, the table creating unit 4 creates an addition table of GF(8) whose characteristic is 8, as illustrated in FIG. 5, and sends the created addition table to the connection table creating unit 5. The multiplication table of FIG. 4 and the addition table of FIG. 5 correspond to the multiplication table and the addition table of GF(8)=GF($2^3$), where an irreducible polynomial f(X)=$x^3$+x+1 serves as a modulus.

Each cell of the multiplication table of GF(8) in FIG. 4 includes an integer obtained by substituting X=2 into a polynomial that is obtained by applying the multiplication of the Equation (6) to the polynomial g(i, X) of the second order or lower over GF(2) that equals the row number i of the cell when X=2 is substituted, and the polynomial g(j, X) that equals the column number j of the cell in the same manner, where f(X)=$x^3$+x+1 and P=2. As a result, each one of the elements 0, 1, 2, 3, 4, 5, 6, and 7 is included in every row and column except for the row 0 and column 0 of the multiplication table for the Galois field GF(8) having the characteristic of 8, as indicated in FIG. 4.

In addition, each cell in the addition table for GF(8) indicated in FIG. 5 includes an integer obtained by substituting X=2 into a polynomial obtained by applying the addition of Equation (5) to the polynomial g(i, X) of the second order or lower over GF(2) that equals the row number of the cell when X=2 is substituted and the polynomial g(j, X) that equals the column number j of the cell in the same manner, where P=2. As a result, each one of the elements 0, 1, 2, 3, 4, 5, 6, and 7 is included in every row and column of the addition table for the Galois field GF(8) having a characteristic of 8, as illustrated in FIG. 5.

Based on the addition table and the multiplication table created by the table creating unit 4, the connection table creating unit 5 creates a connection table for multiple FO's and multiple XB's, which defines the groups of FO's each of which is to be interconnected by an XB.

More specifically, the connection table creating unit 5 receives the multiplication table and the addition table from the table creating unit 4. Furthermore, the connection table creating unit 5 derives a table from the received addition table by selecting any arbitrary cell from the received multiplication table and entering a circle mark into all the cells that have the same value as the one in the selected cell in the multiplication table while leaving all the remaining cells blank. Thereafter, the connection table creating unit 5 maps the derived table onto the selected cell of the multiplication table. Then, the connection table creating unit 5 executes the same process onto all the other cells of the multiplication table, and creates a $Q^2$-row×$Q^2$-column table that has the number of rows and columns each of which is the square of the characteristic Q of the received Galois field.

Thereafter, the connection table creating unit 5 adds to the previously created $Q^2$-row×$Q^2$-column table, Q rows corresponding to the Q columns of the original multiplication table as FIG. 2, i.e., the multiplication table created by the table creating unit 4, then in each of the added rows, enters a circle mark into the Q columns included in each of the corresponding columns of the multiplication table of FIG. 2, and keeps other cells blank, thereby creating a connection table where p=$P^N$+1 and q=$P^N$. This connection table includes ($Q^2$+Q) rows and $Q^2$ columns, with each column containing the number ($P^N$+1) of circle marks and each row containing the number $P^N$ of circle marks. When p=$P^N$+1 and q=$P^N$, the connection table creating unit 5 sends the created connection table to the output unit 6.

Furthermore, when p=$P^N$+1 and q=c(p−1), the connection table creating unit 5 sends to the output unit 6 a connection table of ($Q^2$+Q)-row×c$Q^2$-column cells, which is created by replicating the previously created ($Q^2$+Q)-row×$Q^2$-column connection table when p=$P^N$+1 and q=$P^N$, in the row direction for c−1 times.

Moreover, when p=q=$P^N$+1, or when p=$P^N$+1 and q=cp, the connection table creating unit 5 adds to the connection table previously created when $p=P^N+1$ and $q=P^N$, Q columns corresponding to the Q rows of the original multiplication table of FIG. 2, or in other words the multiplication table created by the table creating unit 4, and in each of the added columns, enters a circle mark into the Q rows included in each of the corresponding rows of the multiplication table of FIG. 2 while keeping other cells blank, thereby completing a table.

This table includes $(Q^2+Q)$ rows and $(Q^2+Q)$ columns. Moreover, the connection table creating unit 5 adds one row and one column to this $(Q^2+Q)$-row×$(Q^2+Q)$-column table and adds a circle mark to the added row and column so that the number of circle marks in every row and column becomes $(P^N+1)$, thereby completing a connection table when $p=q=P^N+1$. This table includes $(Q^2+Q+1)$ rows×$(Q^2+Q+1)$ columns. When $p=q=P^N+1$, the connection table creating unit 5 sends the created $(Q^2+Q+1)$-row×$(Q^2+Q+1)$-column connection table to the output unit 6.

Furthermore, when $p=P^N+1$ and $q=cp$, the connection table creating unit 5 sends to the output unit 6 a $(Q^2+Q+1)$-row× $c(Q^2+Q+1)$-column connection table, which is created by replicating the previously created $(Q^2+Q+1)$-row×$(Q^2+Q+1)$-column connection table when $p=q=P^N+1$, in the row direction for c−1 times.

An example of the process executed by the connection table creating unit 5 is now explained. First, an example of the process of creating a connection table when $p=P^N+1$ and $q=P^N$, or when $p=q=P^N+1$ is explained. For example, when the user inputs either $p=6$ and $q=5$, or $p=q=6$, the connection table creating unit 5 receives the multiplication table and the addition table for GF(5) having the characteristic of 5 illustrated in FIGS. 2 and 3. In such a situation, the connection table creating unit 5 enters a circle mark into all the cells in which 0 is entered in the addition table of FIG. 3 and keeps other cells blank to create a table, and arranges the created table at the positions of all the cells in which 0 is entered in the multiplication table of FIG. 2.

Furthermore, the connection table creating unit 5 enters a circle mark into all the cells in which 1 is entered in the addition table of FIG. 3 and keeps other cells blank to complete a table, and arranges the completed table at the positions of all the cells in which 1 is entered in the multiplication table of FIG. 2. Then, the connection table creating unit 5 executes the same process onto the cells in which other values, 2, 3, and 4, are entered. As a result, the connection table creating unit 5 creates a 25-row×25-column table.

Figure 7:
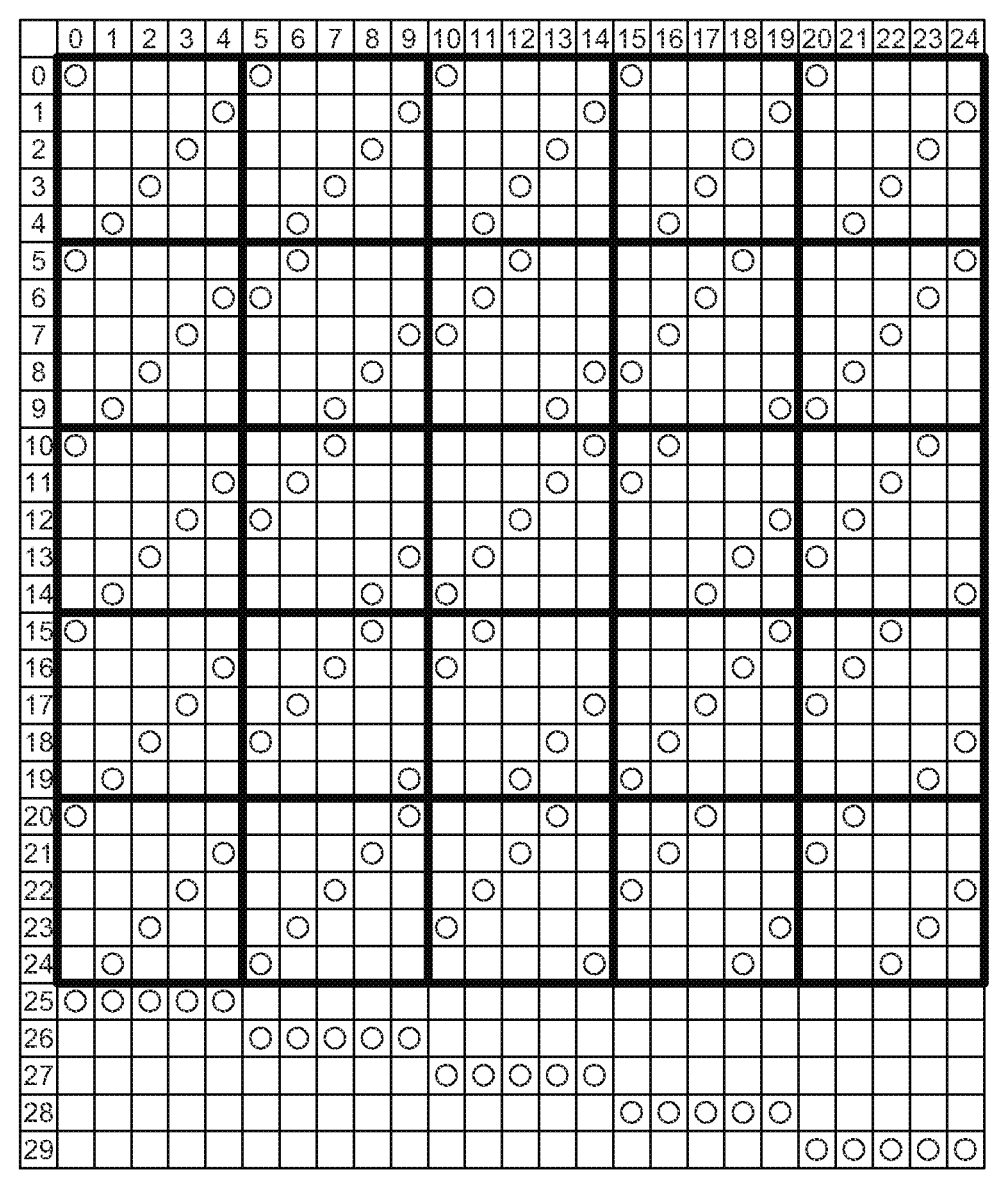

FIG. 7 is a diagram for explaining the connection table created by the connection table creating unit according to the first embodiment when $p=6$ and $q=5$. In the 30-row×25-column table of FIG. 7, the heavy-lined 25-row×25-column area is a table created from the multiplication table of FIG. 2 and the addition table of FIG. 3. In other words, the heavy lines correspond to the individual cells of the original multiplication table of FIG. 2. The connection table creating unit 5 adds 5 rows that correspond to the 5 columns of FIG. 2 to this 25-row×25-column table. Then in each added row, the connection table creating unit 5 enters a circle mark into five columns included in the corresponding column of FIG. 2 and keeps other cells blank, thereby creating a 30-row×25-column connection table as indicated in FIG. 7.

In other words, the connection table creating unit 5 first adds rows of the row numbers 25 to 29 in FIG. 7. Here, the row of the row number 25 in FIG. 7 corresponds to the column number 0 in the original multiplication table of FIG. 2, and the row of the row number 26 in FIG. 7 corresponds to the column number 1 in FIG. 2. In addition, the row of the row number 27 in FIG. 7 corresponds to the column number 2 in FIG. 2, and the row of the row number 28 in FIG. 7 corresponds to the column number 3 in FIG. 2. Moreover, the row of the row number 29 in FIG. 7 corresponds to the column number 4 in FIG. 2.

Next, the connection table creating unit 5 enters a circle mark into the cells of the column numbers 0 to 4 in the row of the row number 25, also enters a circle mark in the cells of the column numbers 5 to 9 in the row of the row number 26, and keeps other cells blank. Furthermore, the connection table creating unit 5 enters a circle mark into the cells of the column numbers 10 to 14 in the row of the row number 27, enters a circle mark into the cells of the column numbers 15 to 19 in the row of the row number 28, and keep other cells blank. Moreover, the connection table creating unit 5 enters a circle mark into the cells of the column numbers 20 to 24 in the row of the row number 29, and keeps other cells blank, thereby completing a 30-row×25-column connection table. When $p=6$ and $q=5$, the connection table creating unit 5 sends the created 30-row×25-column connection table to the output unit 6. This is an example of the process when $p=P^N+1$ and $q=P^N$, where $P=5$ and $N=1$.

Figure 6:
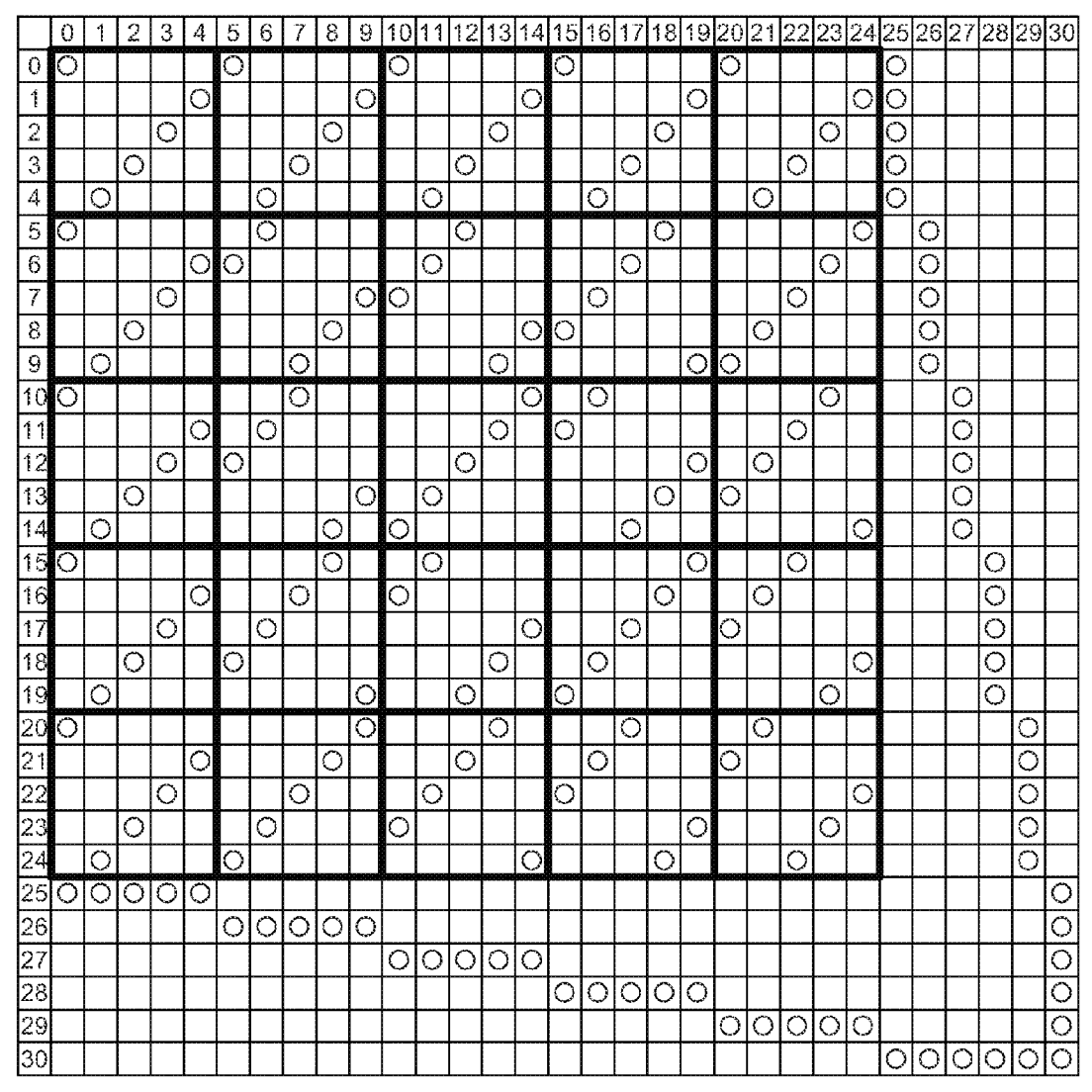

FIG. 6 is a diagram for explaining the next connection table created by the connection table creating unit 5 when $p=q=6$. In the 31-row×31-column table of FIG. 6, the area of 30 rows×25 columns of the column numbers 0 to 24 is the connection table of FIG. 7 when $p=6$ and $q=5$. In the same manner as in FIG. 7, the heavy-line areas correspond to the individual cells of the original multiplication table of FIG. 2. The connection table creating unit 5 adds to this 30-row×25-column table, five columns of the column numbers 25 to 29 corresponding to the five rows of the original multiplication table of FIG. 2. Then in each added column, the connection table creating unit 5 enters a circle mark into five rows included in the corresponding row of FIG. 2 while keeping other cells blank to complete a 30-row×30-column table.

In other words, in the example of FIG. 6, the connection table creating unit 5 enters a circle mark into the cells of the row numbers 0 to 4 in the column number 25, the cells of the row numbers 5 to 9 in the column number 26, and the cells of the row numbers 10 to 14 in the column number 27, and keeps other cells blank. Moreover, the connection table creating unit 5 enters a circle mark into the cells of the row numbers 15 to 19 in the column number 28 and the cells of the row numbers 20 to 24 in the column number 29, and keeps other cells blank, thereby creating a 30-row×30-column table.

Furthermore, the connection table creating unit 5 adds the row of the row number 30 and the column of the column number 30 to the 30-row×30-column table. Then, the connection table creating unit 5 creates a 31-row×31-column connection table in which a circle mark is added to each cell of the added row of the row number 30 and the added column of the column number 30 so that the number of circle marks in every row and every column becomes 6. In other words, the connection table creating unit 5 enters a circle mark into the cells of the column numbers 25 to 30 in the row of the row number 30, and enters a circle mark into the cells of the row numbers 25 to 29 in the column of the column number 30. When $p=q=6$, the connection table creating unit 5 sends the created 31-row×31-column connection table to the output unit 6. This is an example of $P=5$ and $N=1$ in the process executed when $p=q=P^N+1$.

The above process of creating a table in which a circle mark is entered into the row of the columns included in the corresponding column in the original multiplication table of FIG. 2, and a circle mark is also entered into the column of the rows included in the corresponding row in FIG. 2, while keeping other rows blank, may be realized in the following manner.

The connection table creating unit 5 adds (Q+1) rows and (Q+1) columns to the table of $Q^2$ rows×$Q^2$ columns. Then, the connection table creating unit 5 enters a circle mark into the cells of the column number $Q^2+Q_L$, where $Q_L$ is the quotient obtained by dividing L by Q, among the cells in the rows of the row numbers that are L<$Q^2$. In other words, in the added columns, the connection table creating unit 5 enters a circle mark into the cells included in the corresponding row of the original multiplication table of FIG. 2.

Furthermore, the connection table creating unit 5 enters a circle mark into the cells of the row number $Q^2+Q_C$, where $Q_C$ is the quotient obtained by dividing C by Q, among the cells in the columns of the column numbers that are C<$Q^2$. In other words, in the added rows, the connection table creating unit 5 enters a circle mark into the cells included in the corresponding column of the original multiplication table of FIG. 2.

Moreover, regarding the cells where the added rows and the added columns meet, the connection table creating unit 5 enters a circle mark into the cells of the row number $Q^2+Q$ or the column number $Q^2+Q$. In other words, the connection table creating unit 5 adds a circle mark to an added row and an added column so that the number of circle marks in the cells of every row and column becomes ($P^N+1$).

For example, the connection table creating unit 5 creates a connection table of 25 rows×25 columns from the multiplication table and the addition table, for GF(5) where the characteristic is 5. In addition, the connection table creating unit 5 adds 6 rows and 6 columns to the created connection table. Then, the connection table creating unit 5 enters a circle mark into the cells of the column number 25 calculated from $Q^2+Q_L$ among the cells of the row numbers 0 to 4. Further, the connection table creating unit 5 enters a circle mark into the cells of the column number 26 calculated from $Q^2+Q_L$, among the cells of the row numbers 5 to 9. Similarly, the connection table creating unit 5 enters a circle mark into the cells of the column number expressed by $Q^2+Q_L$, for the cells of each row number.

Furthermore, the connection table creating unit 5 enters a circle mark into the cell of the row number 25 calculated from $Q^2+Q_C$, among the cells of the column numbers 0 to 4. The connection table creating unit 5 also enters a circle mark into the cells of the row number expressed in $Q^2+Q_C$ among the cells of all the other column numbers. In addition, the connection table creating unit 5 enters a circle mark into the cells of the column number 30, among the cells of the row numbers 25 to 30. Similarly, the connection table creating unit 5 enters a circle mark into the cells of the row number 30, among the cells of the column numbers 25 to 30. Thereafter, the connection table creating unit 5 sends the created connection table to the output unit 6.

In this manner, the connection table creating unit 5 may create the connection table of FIG. 6, based on the table created from the multiplication table and the addition table and also the connection calculated from $Q^2+Q_L$ and $Q^2+Q_C$.

Here, in the connection table created by the connection table creating unit 5, each row number indicates an XB, while each column number indicates an FO. For example, the connection table created by the connection table creating unit 5 of FIG. 6 indicates that the XB of the number 0 is connected to the FO's of the numbers 0, 5, 10, 15, 20, and 25.

For any pair of columns in FIG. 6, the row of a row number in which a circle mark is entered in both of these columns can be found, and this row number is uniquely determined for any pair of columns. Thus, when 31 XB's are connected to 31 FO's in accordance with FIG. 6, an XB that relays communications for each pair of FO's can be uniquely determined.

Next, the process of generating a connection table when $p=P^N+1$ and q=c(p−1) is explained. For example, when the user inputs p=4 and q=6, P=3, N=1, c=2 can be obtained since $p=P^N+1$ and q=c(p−1) hold.

Accordingly, the connection table creating unit 5 receives the multiplication table and the addition table for GF(3) from the table creating unit 4. The connection table creating unit 5 creates a 9-row×9-column table by use of the multiplication table and the addition table for GF(3). FIG. 8 is a diagram for explaining the connection table for p=4 and q=6. In the table of FIG. 8, the 9-row×9-column area of the row numbers 0 to 8 and the column number 0 to 8 in the heavy-lined area is the table created from the multiplication table and the addition table for GF(3) having the characteristic 3.

Furthermore, the connection table creating unit 5 adds, to the created 9-row×9-column table, 3 rows that are associated with 3 columns of the multiplication table received from the table creating unit 4, then in each added row, enters a circle mark into the 3 columns included in the associated column of the original multiplication table, and keeps other cells blank. That is, the connection table creating unit 5 adds the rows of the row numbers 9 to 11, in the example of FIG. 8. Then, the connection table creating unit 5 enters a circle mark into the cells of the column numbers 0 to 2 in the row of the row number 9, and also into the cells of the column numbers 3 to 5 in the row of the row number 10, and keep other cells blank. Furthermore, the connection table creating unit 5 enters a circle mark into the cells of the columns number 6 to 8 in the row of the row number 11, and keeps other cells blank, thereby creating a 12-row×9-column table.

Thereafter, the connection table creating unit 5 replicates the created 12-row×9-column table once in the row direction. In other words, in the example of FIG. 8, the connection table creating unit 5 creates a table by replicating the area of the column numbers 0 to 8 onto the area of the column numbers 9 to 17. Thereafter, the connection table creating unit 5 sends the created 12-row×18-column table to the output unit 6.

Here, the FO's that occupy the same relative position among the replicated connection tables are redundantly connected to each other.

Moreover, in the above explanation, the connection table creating unit 5 creates a table based on a multiplication table and an addition table for a Galois field, adds numbers of rows and columns according to p and q to the created table, and thereby creates a connection table. However, the connection table creating unit 5 may create a connection table by deleting rows and columns the numbers of which correspond to p and q, from the ($Q^2+Q+1$)-row×($Q^2+Q+1$)-column connection table that is created when $p=q=P^N+1$.

In other words, the connection table creating unit 5 creates a ($Q^2+Q+1$)-row×($Q^2+Q+1$)-column connection table of the case $p=q=P^N+1$, based on p that is input by the user. Then, the connection table creating unit 5 creates a connection table by deleting unnecessary rows and columns from the created connection table, based on p and q that are input by the user.

For example, when the user inputs p=6 and q=5, the connection table creating unit 5 creates a 31-row×31-column connection table as indicated in FIG. 6 by determining P=5 and N=1. Next, the connection table creating unit 5 selects any one row from the created 31-row×31-column connection table, and selects all cells in which a circle mark is entered from the cells of the selected row. Then, the connection table creating unit 5 deletes the selected row and all of the columns that have included the selected cells from the 31-row×31-column connection table.

If the row of the row number 30 is selected from the 31-row×31-column connection table of FIG. 6, the connection table creating unit 5 deletes the columns of the column numbers 25 to 30 in which a circle mark is entered in the row of the row number 30 and the row of the row number 30 from the connection table. Then, the connection table creating unit 5 obtains the 30-row×25-column connection table of FIG. 7. Thereafter, the connection table creating unit 5 sends the 30-row×25-column connection table to the output unit 6.

In FIG. 2, the output unit 6 receives the connection table created by the connection table creating unit 5. Then, the output unit 6 displays the received connection table onto the monitor 8. In addition to displaying the connection table onto the monitor 8, the output unit 6 may also send the data of the connection table to a printer or the like so that the connection table can be printed out on the printer.

The receiving unit 2, the generating unit 3, the table creating unit 4, the connection table creating unit 5, and the output unit 6 may be an electronic circuit. Here, an integrated circuit such as an application specific integrated circuit (ASIC) and a field programmable gate array (FPGA), and a central processing unit (CPU), a micro processing unit (MPU) and the likes may be deployed for the electronic circuit.

Next, when $p=q=P^N+1$, proof that an XB that relays communications among FO's is uniquely determined in accordance with the connection table created by the connection table creating unit 5 is now provided, referring the connection table of FIG. 6. In the following explanation, each of the heavy-lined areas of 5×5 cells in FIG. 6, or in other words, each area derived by the mapping, on each cell of the original multiplication table, the addition table in which a circle mark is stored in cells that have the same value as the cell of the original multiplication table while leaving all the remaining cells blank, is regarded as one "square".

For example, if a pair of FO's are connected redundantly to two XB's, a rectangle that has four circle marks as its vertices and four sides in rows and columns of the connection table is formed on the connection table created by the connection table creating unit 5.

Here, it is assumed that two vertices on one side of the rectangle are included in one square. In other words, it is assumed that the area mapping the table, in which a circle mark is entered into the cells that have the same value in the original addition table, includes a row or a column that includes two circle marks. However, in the addition table for a Galois field, there are no two cells having the same value in any one row or any one column. This means that there is no row or column that includes two circle marks in the table created from the original addition table in the above manner. For this reason, the assumption that two vertices can be included in a heavy-lined square of 5×5 cells in FIG. 6 does not hold.

Next, a situation in which one of the vertices of the rectangle is positioned outside (hereinafter, "external area") of the area derived by the mapping of the addition table on the multiplication table in the connection table is considered. First, based on the method of entering a circle mark in the external area, it is clear that no rectangle exists with all of its vertices in the external area. It is also clear that, if one of the vertices of the rectangle is in the external area, at least the other vertex of one side is also in the external area.

These two vertices in the external area constitute one side of the rectangle, and based on the method of entering a circle mark in the external area, the other two vertices need to be included in one square. As discussed above, however, the assumption that two vertices can be included in one square that is obtained by mapping the table created from the original addition table, i.e., the addition table received from the table creating unit 4, does not hold. Thus, no rectangle can exist with two of its vertices in the external area and the other two vertices in the area defined by the addition table and the multiplication table.

Next, a situation that all the vertices of the rectangle are in different squares is considered. The values entered in the cells of the original multiplication table, or in other words, the multiplication table received from the table creating unit 4 that correspond to the squares of the vertices, are set as a, b, c, and d. The squares of a and d and the squares of b and c each include diagonally opposing vertices of the rectangle.

Here, because the squares of a, b, c, and d correspond to different cells of the original multiplication table, a=b=c=d=0 does not hold in accordance with the multiplication table for a Galois field. Thus, it is determined as a≠0 and the universality is not lost.

Because the vertices of the rectangle are in different squares and a≠0 is found, it is determined to be b≠a and c≠a. Moreover, ad=bc holds in accordance with a multiplication table for a Galois field. Here, if all the squares of the connection table are overlaid on one another, a and c, as well as b and d, become opposing corners in the vertices in the overlaid square, and each side thereof forms a rectangle or a degraded side included in the rows and columns of the addition table. Thus, a+d=b+c is determined in accordance with an addition table for a Galois field.

Here, (a−b)×(a−c)=0 is found from ad=bc and a+d=b+c, which contradicts b≠a and c≠a. Thus, no such rectangle exists. Because of the above, it is proven that an XB to be connected is uniquely determined for each pair of FO's in accordance with the connection table of $p=q=P^N+1$.

Next, an example of the process executed by the connection table creating device 1 is explained. In the following example, the user prepares XB's having three ports and FO's having four ports, in other words, FO's that can be connected to one node and three XB's, to establish a network. In such a situation, the user inputs p=q=3 to the connection table creating device 1 by way of the keyboard 7.

In such a situation, the connection table creating device 1 finds P=2 and N=1 from p=q=3, and creates a multiplication table and an addition table for the Galois field GF(2) having the characteristic of 2, as illustrated in FIGS. 9 and 10.

FIG. 9 is a diagram for explaining the multiplication table for GF(2). In the multiplication table for GF(2) in FIG. 9, the remainder left when dividing the product of the row numbers 0 to 1 and the column numbers 0 to 1 of the cells by 2, which is the characteristic of GF(2), is entered in the cells. Furthermore, as illustrated in FIG. 9, both remainders, 0 and 1, which can be obtained by dividing an integer by the characteristic 2 of GF(2) are included in each row and each column except for the row 0 and the column 0 in the multiplication table.

FIG. 10 is a diagram for explaining the addition table for GF(2). The remainders left when dividing the sum of the row numbers 0 to 1 and the column numbers 0 to 1 of the cells by 2, which is the characteristic of GF(2), are entered in the cells of the addition table for GF(2) in FIG. 10. Moreover, as illustrated in FIG. 10, both remainders 0 and 1 that can be obtained by dividing an integer by 2, the characteristic of GF(2), are included in each row and each column of the addition table.

Furthermore, the connection table creating device 1 maps the table in which a circle mark is entered into the cells with 0 of the addition table of FIG. 10 and other cells are kept blank, onto the cells of the multiplication table of FIG. 9 in which 0 is entered. Still further, the connection table creating device 1 maps the table in which a circle mark is entered into the cells with 1 of the addition table and other cells are kept blank, onto the cells of the multiplication table in which 1 is entered, thereby creating a 4-row×4-column table.

FIG. 11 is a diagram for explaining a connection table for p=q=3. The heavy-lined 4-row×4-column area in FIG. 11 is the table created by using the multiplication table of FIG. 9 and the addition table of FIG. 10. Then, the connection table creating device 1 adds two rows of the row number 4 that corresponds to the column of the column number 0 in the multiplication table of FIG. 9 and the row number 5 that corresponds to the column of the column number 1 in the multiplication table of FIG. 9.

Here, the column of the column number 0 in the multiplication table of FIG. 9 becomes the columns of the column numbers 0 and 1 in FIG. 11. For this reason, in the row number 4, the connection table creating device 1 enters a circle mark into the cells of the column numbers 0 and 1, and keeps other cells blank. Similarly, the column of the column number 1 in the multiplication table of FIG. 9 becomes the columns of the column numbers 2 and 3 in FIG. 11. Thus, in the row number 5, the connection table creating device 1 enters a circle mark into the cells of the column numbers 2 and 3 and keeps other cells blank.

Next, the connection table creating device 1 adds two columns of the column number 4 that corresponds to the row number 0 of the multiplication table of FIG. 9 and the column number 5 that corresponds to the row number 1 of the multiplication table of FIG. 9. Here, the row of the row number 0 in the multiplication table of FIG. 9 becomes the rows of the row numbers 0 and 1 in the table of FIG. 11, and the row of the row number 1 in the multiplication table of FIG. 9 becomes the rows of the row numbers 2 and 3 in the table of FIG. 11. Thus, the connection table creating device 1 enters a circle mark into the cells of the row numbers 0 and 1 in the column of the column number 4, and keeps other cells blank. Further, the connection table creating device 1 enters a circle mark into the cells of the row numbers 2 and 3 in the column of column number 5, and keeps other cells blank.

Furthermore, the connection table creating device 1 adds the row of the row number 6 and the column of the column number 6, and adds a circle mark into the row of the row number 6 and the column of the column number 6 so that the number of circle marks in every row and every column becomes 3. In other words, the connection table creating device 1 enters a circle mark into the cells of the column numbers 4, 5, and 6 in the row of the row number 6, and keeps other cells blank. In addition, the connection table creating device 1 enters a circle mark into the cells of the row numbers 4 and 5 in the column of the column number 6, and keeps other cells blank. Thereafter, the connection table creating device 1 outputs the created 7-row×7-column connection table.

Figure 12:
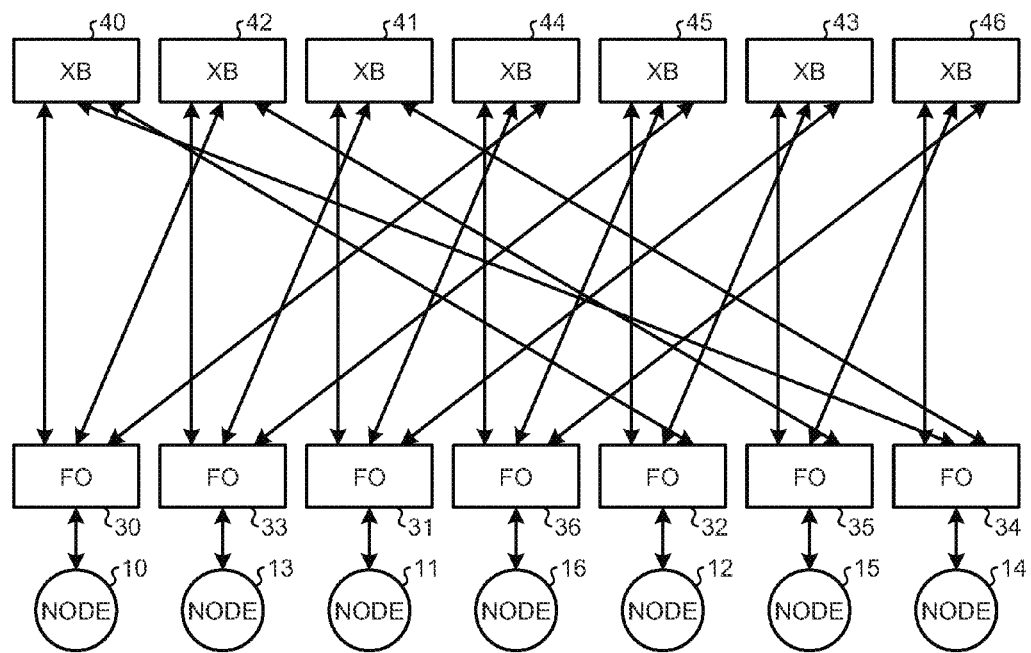
FIG. 12 is a diagram for explaining a network generated in accordance with the connection table.

FIG. 12 is a diagram for explaining a network created in accordance with the connection table. In the example of FIG. 12, seven nodes 10 to 16, seven FO's 30 to 36, and seven XB's 40 to 46 are connected to one another in accordance with the connection table of FIG. 11. More specifically, the nodes 10 to 16 are connected to the FO's 30 to 36, respectively. Then, the row numbers 0 to 6 in the connection table of FIG. 11 are brought into association with the XB's 40 to 46, and the column numbers 0 to 6 are brought into association with the FO's 30 to 36. XB's associated with the row numbers of the cells in which a circle mark is entered are connected to FO's associated with the column numbers of these cells.

The nodes 10 to 16 may be computers that form a cluster, network devices that are connected to an external network, or the like. Furthermore, the FO's 30 to 36 are fan-out switches provided with four ports, and the XB's 40 to 46 are crossbar switches provided with three ports.

For example, the FO 30 stores therein a connection table in which information of a destination node to which data is to be sent is associated with information of a forwarding XB. When data is to be sent to the node 12, the node 10 sends, as a packet, data to which an identifier of the node 12 is attached, to the FO 30 to which the node 10 itself is connected.

When receiving the packet from the node 10 connected to the FO 30, the FO 30 determines the destination node 12 based on the identifier attached to the packet, and finds the information indicating the XB 40, which is associated with the information of the determined destination node 12, from the connection table. Then, the FO 30 sends the packet received from the node 10, to the XB 40. When receiving the packet addressed to the node 12 from the FO 30, the XB 40 sends the received packet to the FO 32 that is connected to the node 12. Thereafter, the FO 32 sends the received packet to the node 12.

Procedure of Process Executed by Connection Table Creating Device

Figure 13:
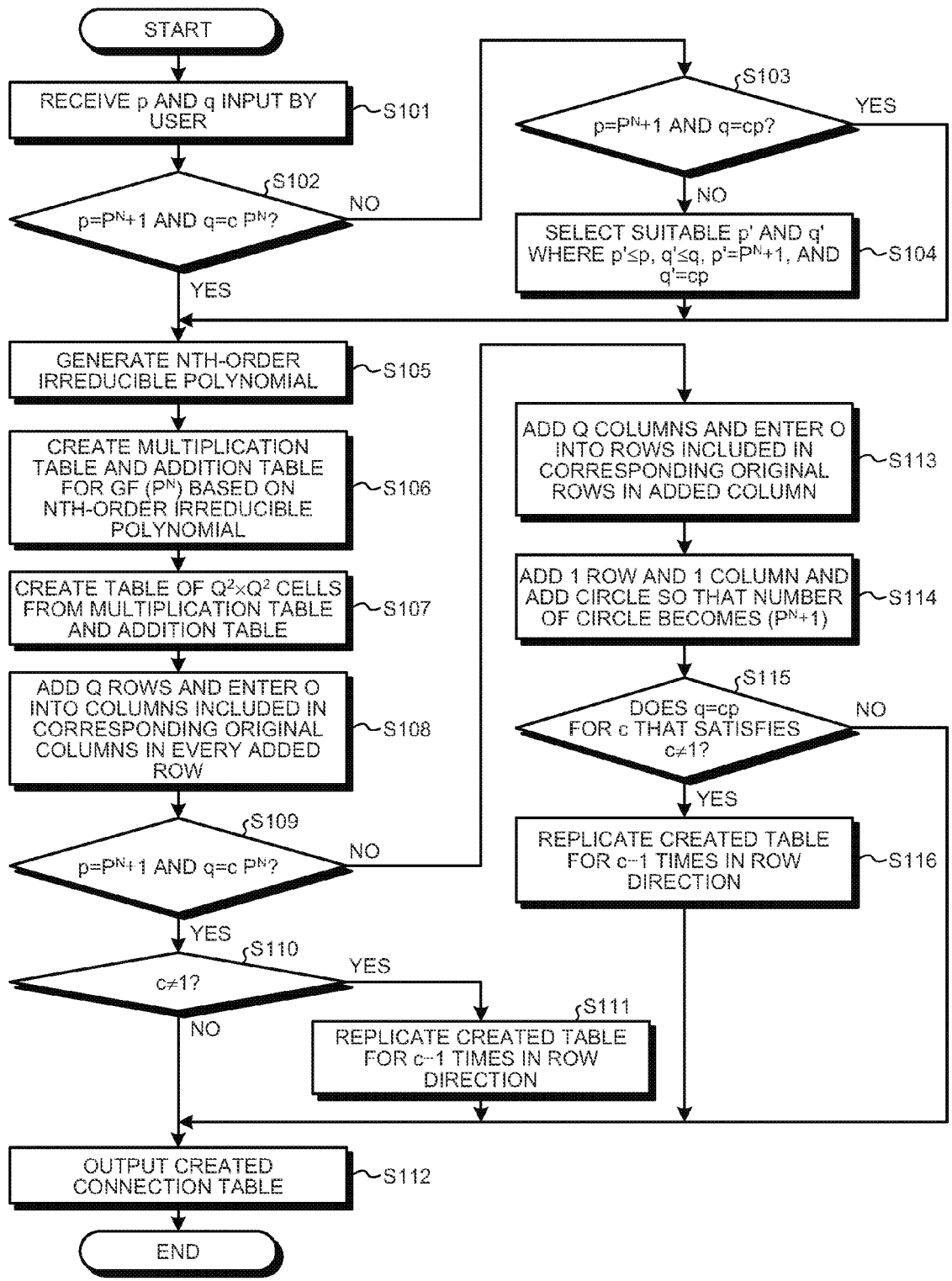
FIG. 13 is a flowchart for explaining the procedure of a process executed by the connection table creating device according to the first embodiment.

Next, the process executed by the connection table creating device 1 is explained with reference to FIG. 13. FIG. 13 is a flowchart for explaining the procedure of the process executed by the connection table creating device according to the first embodiment. Triggered by input of p and q on the keyboard 7 by the user, the connection table creating device 1 starts the process.

First, the connection table creating device 1 receives p and q that are input by the user (step S101). Next, the connection table creating device 1 determines whether the received p and q satisfy both $p=P^N+1$ and $q=cP^N$ (step S102). Then, when it is determined that the received p and q satisfy $p=P^N+1$ and $q=cP^N$ (yes at step S102), the connection table creating device 1 formulates an Nth-order irreducible polynomial, based on P and N (step S105).

On the other hand, when it is not determined that p and q satisfy $p=P^N+1$ and $q=cP^N$ (no at step S102), the connection table creating device 1 determines whether they satisfy both $p=P^N+1$ and $q=cp$ (step S103). When it is determined that p and q satisfy $p=P^N+1$ and $q=cp$ (yes at step S103), the connection table creating device 1 formulates an Nth-order irreducible polynomial, based on P and N (step S105).

On the other hand, when it is not determined that p and q satisfy $p=P^N+1$ and $q=cp$ (no at step S103), the connection table creating device 1 selects suitable p' and q' where $p'=P^N+1$, and $q'=cp$ (step S104). Then, the connection table creating device 1 formulates an Nth-order irreducible polynomial, based on P and N that satisfy $p'=P^N+1$ and $p'=cP^N$ (step S105).

Then, the connection table creating device 1 creates a multiplication table and an addition table for $GF(Q=P^N)$, based on the formulated Nth-order irreducible polynomial (step S106). Next, the connection table creating device 1 creates a $Q^2$-row×$Q^2$-column table from the created multiplication table and addition table (step S107). Thereafter, the connection table creating device 1 adds Q rows that correspond to the Q columns of the original multiplication table, to the created $Q^2$-row×$Q^2$-column table. Then, in the added rows, the connection table creating device 1 enters a circle mark into Q columns included in the corresponding columns of the original multiplication table and keeps other cells blank, thereby creating a $(Q^2+Q)$-row×$Q^2$-column table (step S108).

Next, the connection table creating device 1 determines whether both $p=P^N+1$ and $q=cP^N$ are satisfied (step S109), and if they are satisfied (yes at step S109), it determines whether c≠1 is satisfied (step S110). When c≠1 is satisfied (yes at step S110), the connection table creating device 1 creates a $(Q^2+Q)$-row×$cQ^2$-column connection table by replicating the created $(Q^2+Q)$-row×$Q^2$-column table for $c-1$ times in the row direction (step S111). Thereafter, the connection table creating device 1 outputs the created connection table (step S112), and terminates the process. When $c\neq 1$ is not satisfied (no at step S110), the connection table creating device 1 outputs the $(Q^2+Q)$-row×$Q^2$-column connection table (step S112), and terminates the process.

On the other hand, if $p=P^N+1$ and $q=cP^N$ are not satisfied (no at step S109), the connection table creating device 1 executes the following process onto the previously created $(Q^2+Q)$-row×$Q^2$-column connection table (step S113). That is, the connection table creating device 1 adds columns that correspond to the 0 rows of the original multiplication table, enters a circle mark into the Q rows included in each of the corresponding rows of the original multiplication table in the added columns, and keeps other cells blank to create a $(Q^2+Q)$-row×$(Q^2+Q)$-column table. Next, the connection table creating device 1 adds one row and one column, and enters a circle mark into the added row and the added column so that the number of circle marks in every row and every column becomes $P^N+1$ (step S114). At this point, the connection table creating device 1 attains a $(Q^2+Q+1)$-row×$(Q^2+Q+1)$-column connection table. Next, the connection table creating device 1 determines whether c satisfies $c\neq 1$, where $q=cp$ (step S115).

Then, when c satisfies $c\neq 1$ (yes at step S115), the connection table creating device 1 replicates the $(Q^2+Q+1)$-row×$(Q^2+Q+1)$-column connection table for $c-1$ times in the row direction (step S116). In other words, the connection table creating device 1 creates a $(Q^2+Q+1)$-row×$c(Q^2+Q+1)$-column connection table. Thereafter, the connection table creating device 1 outputs the created $(Q^2+Q+1)$-row×$c(Q^2+Q+1)$-column connection table (step S112), and terminates the process.

On the other hand, if c does not satisfy $c\neq 1$ (no at step S115), the connection table creating device 1 outputs the $(Q^2+Q+1)$-row×$(Q^2+Q+1)$-column connection table (step S112), and terminates the process.

Effect of First Embodiment

As discussed above, the connection table creating device 1 creates a multiplication table and an addition table for a Galois field that has a characteristic of a value based on the number p of ports of FO's that serve as the first transfer devices. Then, the connection table creating device 1 creates a connection table that uniquely designates an XB that relays communications for each pair of FO's, based on the created multiplication table and addition table.

For this reason, the connection table creating device 1 can reduce overhead. More specifically, when multiple XB's are connected to multiple FO's in accordance with the connection table created by the connection table creating device 1, a crossbar network that uniquely determines a communication path between nodes can be established. Here, when a communication path between nodes is uniquely determined, each FO can relay communications between the nodes, without performing a routing process to select an XB for relaying the communications between the nodes. Because the connection table creating device 1 does not require a routing process by each FO, overhead can be reduced.

In addition, the connection table creating device 1 can create a connection table for establishing a crossbar network, with fewer components than for a conventional crossbar network in which FO's and XB's are mutually connected. A crossbar network established by the connection table creating device 1 with fewer components is explained below. In the following explanation, it is assumed that processors having p links are non-blockingly connected by XB's having the number q of ports, where p and q satisfy $p=P^N+1$ and $q=cP^N$.

For example, with the method according to Japanese Patent Application Laid-open No 2007-220100, when a crossbar network is constructed with processors having p links and crossbar switches having q ports, crossbar connections can be realized for the number $(p+1)\times q/2$ of processors by use of the number $(p+1)\times p/2$ of crossbar switches by $p+1$ processor clusters that each include $q/2$ processors.

On the other hand, a processor having p links may be considered as a node that is connected to an FO that can be connected to the number p of XB's. Then, when multiple processors are connected by multiple XB's in accordance with the connection table created by the connection table creating device 1, the number $(p-1)\times q$ of processors can be connected by the number $(p-1)\times p$ of XB's.

In other words, when multiple processors are connected to multiple XB's in accordance with the connection table created by the connection table creating device 1, a crossbar network that connects more processors than the conventional networks do can be constructed by use of XB's that have the same number of ports as in the conventional ones. It can also be said that, when multiple processors are connected to multiple XB's in accordance with the connection table created by the connection table creating device 1, a crossbar network that connects the same number of processors as the conventional ones can be constructed with less resources.

In addition, the connection table creating device 1 creates a table by bringing the cells of the multiplication table into association with the entire addition table, and entering connection information in those of the cells of the addition table that have the same value as the corresponding cell of the multiplication table. Then, based on the created table, the connection table creating device 1 creates a connection table. For this reason, the connection table creating device 1 can effectively create a connection table that uniquely determines an XB for relaying the communication for each pair of FO's. In other words, the connection table creating device 1 can readily create a connection table in accordance with the multiplication table and the addition table of a Galois field based on the number of ports of XB's that are used for constructing a network, without performing any calculation or the like to determine the XB for relaying the communication for each pair of FO's.

In addition, when the received p and q satisfy both $p=P^N+1$ and $q=P^N$, the connection table creating device 1 creates a $Q^2$-row×$Q^2$-column table, by use of the multiplication table and addition table of the Galois field GF(Q) having a characteristic of Q. Then, the connection table creating device 1 adds Q rows each corresponding to the Q columns of the original multiplication table to the created $Q^2$-row×$Q^2$-column table. Thereafter, in the added Q rows, the connection table creating device 1 enters connection information into Q cells included in the corresponding columns of the original multiplication table. In this manner, the connection table creating device 1 can readily create a connection table.

Moreover, when the received p and q satisfy both $p=P^N+1$ and $q=cP^N$, the connection table creating device 1 creates a connection table by replicating the connection table created when $p=P^N+1$ and $q=P^N$, for $c-1$ times in the row direction. In this manner, the connection table creating device 1 can readily create a connection table.

Still further, when the received p and q satisfy $p=q=P^N+1$, the connection table creating device 1 adds Q columns that correspond to the Q rows of the original multiplication table to the connection table created when $p=P^N+1$ and $q=P^N$. Then, the connection table creating device 1 creates a table in which connection information is entered into Q cells included in the corresponding rows of the original multiplication table in each of the added Q columns. Further, the connection table creating device 1 adds one row and one column to the created table, enters the connection information into the added row and column so that the number of items of connection information entered in the cells of every row and every column becomes $P^N+1$. In this manner, the connection table creating device 1 can readily create a connection table.

Moreover, when the received p and q satisfy both $p=P^N+1$ and $q=cp$, the connection table creating device 1 replicates the connection table created when $p=q=P^N+1$, for $c-1$ times in the row direction to create a connection table. In this manner, the connection table creating device 1 can readily create a connection table.

[b] Second Embodiment

In the above, the embodiment of the present invention has been explained. The embodiment, however, may be realized in various manners other than the above. Thus, other embodiments of the present invention are explained below as the second embodiment.

(1) Connection Table

The connection table creating device 1 creates the connection table that indicates connections of FO's, which are the first transfer devices, and XB's, which are the second transfer devices. The embodiments are not limited thereto, however. For example, when $p=q=P^N+1$ is satisfied, FO's and XB's can be brought into a one-to-one correspondence. Thus, the structure may be such that FO's having the number p+1 of ports and XB's having the number q of ports are housed in XB's having the number p+q−1 of ports. For this reason, the connection table creating device 1 may create a connection table that indicates connections of XB's that each include an FO therein and each have the number p+q−1 of ports, and uniquely determines the communication paths between the nodes.

More specifically, the connection table creating device 1 executes the same process as in the first embodiment. Then, the connection table creating device 1 outputs each row number and each column number as the number that indicates an XB. In other words, the connection table creating device 1 creates a connection table by considering part of the multiple ports of an XB as the ports of an FO.

Figure 14:
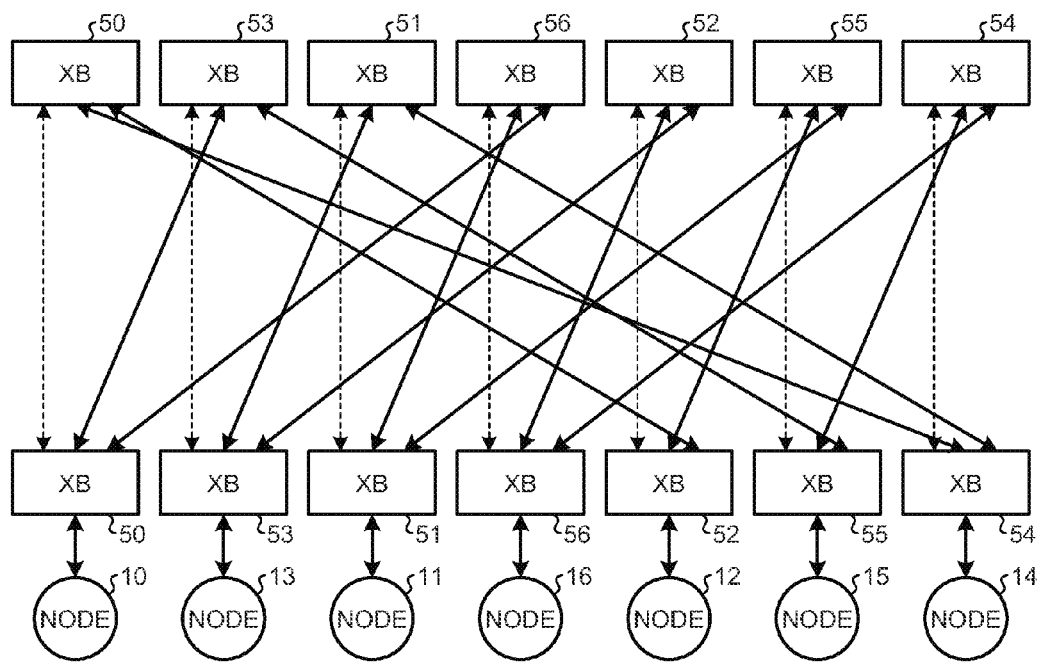
FIG. 14 is a diagram for explaining an example structure of a crossbar network that employs crossbar switches only, without using any fan-out switches.

FIG. 14 is a diagram for explaining an example structure of a crossbar network that adopts crossbar switches only, without using any fan-out switches. In FIG. 14, the XB's that are connected with a dashed line indicate the same XB's. In the example of FIG. 14, the functions of the FO's 30 to 36 and the XB's 40 to 46 in the network of FIG. 12 are contained in XB's 50 to 56. In other words, the connection table creating device 1 creates a connection table by regarding, out of five ports of each of the XB's 50 to 56, three of them as the FO's 30 to 36, and the other two as the XB's 40 to 46.

As discussed above, when the input p and q satisfy $p=q=P^N+1$, the connection table creating device 1 may create a connection table that illustrates XB-to-XB connections. When such a connection table is created, the connection table creating device 1 does not require any FO to be connected to each node, which further simplifies the construction of the network.

Moreover, the XB's 50 to 56 of FIG. 14 operates as an XB that relays the communications among the nodes 10 to 16. In other words, when p and q satisfy $p=q=P^N+1$, the connection table creating device 1 creates a connection table that illustrates a network adopting XB's that each have the number q of ports available for the user and operating as a large-scale XB.

(2) Network

Figure 15:
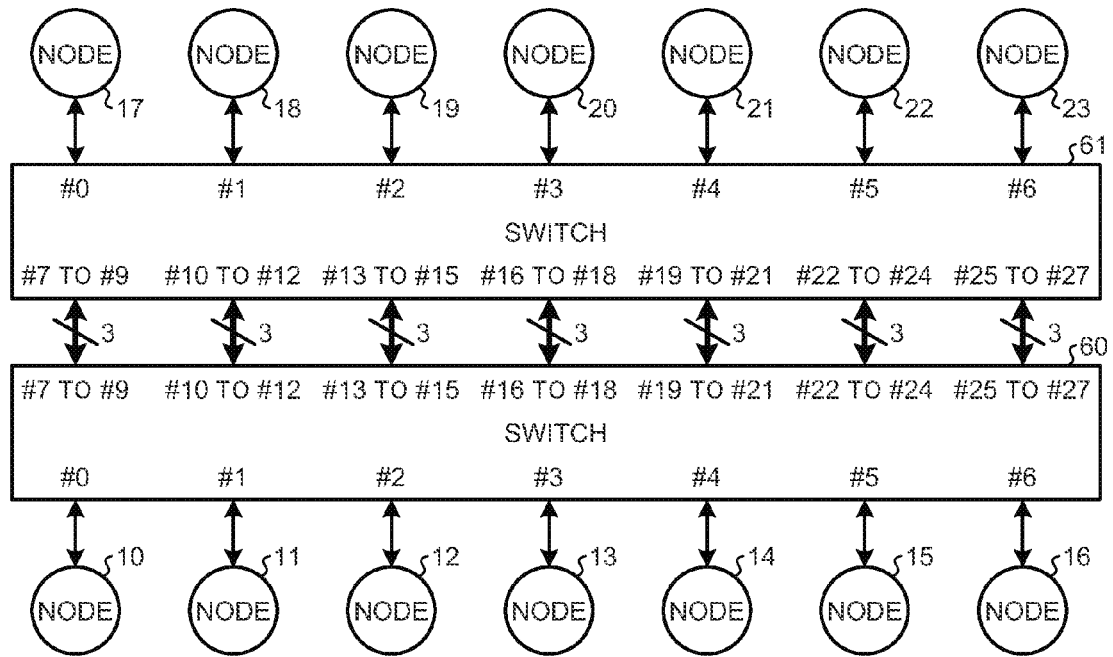
FIG. 15 is a diagram for explaining a network in which crossbar switches are connected to crossbar switches.

The network structured as in FIG. 14 operates as a large XB by establishing a cross-bar connection with a similar network. FIG. 15 is a diagram for explaining networks in which cross-bar switches are connected to each other. In the example of FIG. 15, a crossbar connection is established between nodes 10 to 16 and nodes 17 to 23 by way of switches 60 and 61.

Furthermore, ports #0 to #6 of the switch 60 are connected to the nodes 10 to 16, respectively, and ports #7 to #27 are connected to ports #7 to #27 of the switch 61, respectively. Further, ports #0 to #6 of the switch 61 are connected to the nodes 17 to 23, respectively.

Figure 16:
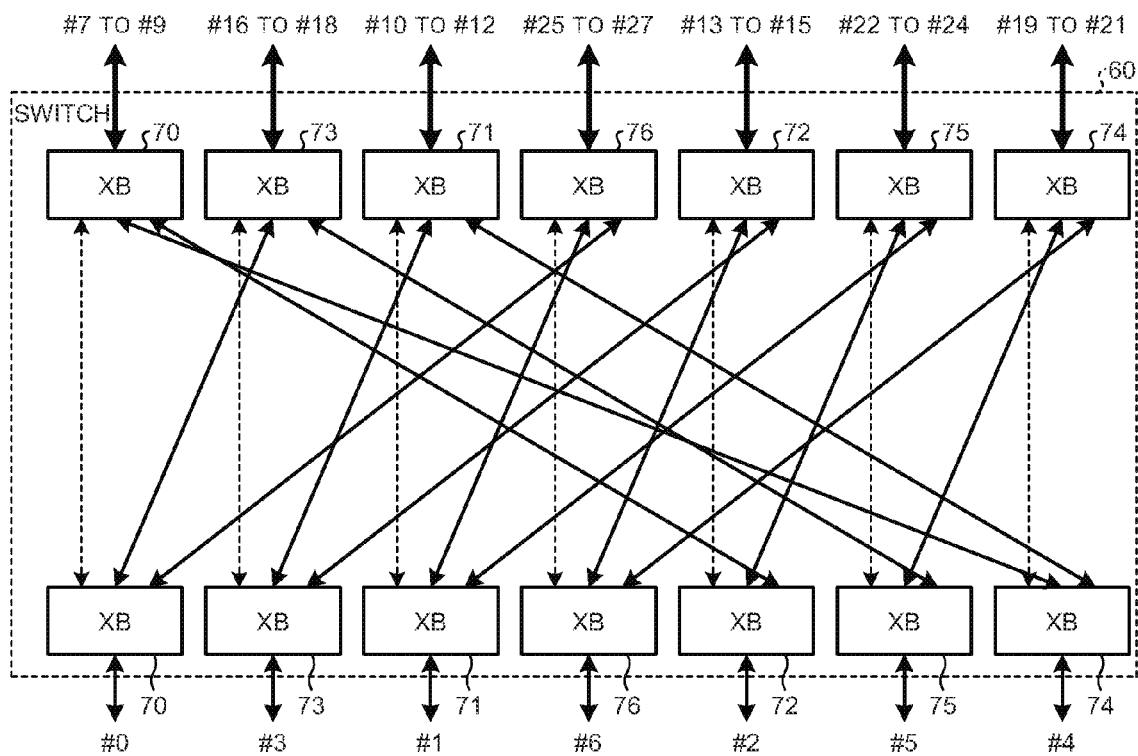
FIG. 16 is a diagram for explaining an example of connections between crossbar switches.

FIG. 16 is a diagram for explaining an example of the connection between crossbar switches. As illustrated in FIG. 16, the switch 60 is a crossbar switch constituted of XB's 70 to 76 that are connected in accordance with a connection table similar to that of FIG. 14. The XB's 70 to 76 correspond to the XB's 50 to 56 to each of which three ports are added. Each of the XB's 70 to 76 has one port that operates as the corresponding one of the ports #0 to #6, and the remaining ports operating as ports #7 to #27. The switch 61 has a structure similar to that of the switch 60.

In the switch 60 and the switch 61, the ports #7 to #9, the ports #10 to #12, the ports #13 to #15, the ports #16 to #18, the ports #19 to #21, the ports #22 to #24, and the ports #25 to #27 are connected to the counterparts with the same numbers. In other words, the switch 60 and the switch 61 are connected to each other by way of the three ports that are added to each XB.

For example, when relaying communications between the node 10 and the node 11, the switch 60 transfers the data transmitted from the node 10, to the node 11 by way of the XB's 70, 76, and 71. In other words, when relaying communications among the nodes 10 to 16, the switch 60 relays the data by three-hopping on any three of the XB's 70 to 76 of the switch 60.

Furthermore, for example, when communications between the node 10 and the node 18 are to be relayed, the switch 60 first considers the node 18 as the node 11 connected to the port 1 of the switch 60 because the node 18 is connected to the port 1 of the switch 61, and transfers the data transmitted from the node 10 to the switch 61 by way of the XB 70 and the XB 76, and then one of the ports #25 to #27 assigned in a fixed manner to the node 18. Thereafter, the switch 61 transmits the data received from switch 60 to the node 18 by two-hopping.

The same process is executed to relay communications when data is transmitted from the nodes 17 to 23 to the nodes 10 to 16. Furthermore, data is transmitted and received between the switch 60 and the switch 61 by one of the ports #7 to #27 assigned in a fixed manner in accordance with the destination node, and thus the connection between the switch 60 and the switch 61 is non-blocking. As result, the entire network of FIG. 15 serves as a crossbar network.

Based on the properties of the network as mentioned above, the connection table creating device 1 may execute the following process. That is, when the user inputs p and q, the connection table creating device 1 creates a connection table to construct a crossbar network with the number p+q−1 of XB's as in FIG. 14. Moreover, the connection table creating device 1 may create a connection table that indicates a network as illustrated in FIGS. 15 and 16, by combining the created connection tables.

(3) Output Form

The connection table creating device 1 outputs a connection table of a tabular form in which the row numbers correspond to XB's and the column numbers correspond to FO's, as indicated in FIGS. 6 to 8 and 11. However, the embodiment is not limited thereto, and, for example, as indicated in FIG.

12, a connection diagram of FO's and XB's may be output. In addition, the connection table creating device 1 can output any information that illustrates connections in any suitable form.

(4) Program

Figure 17:
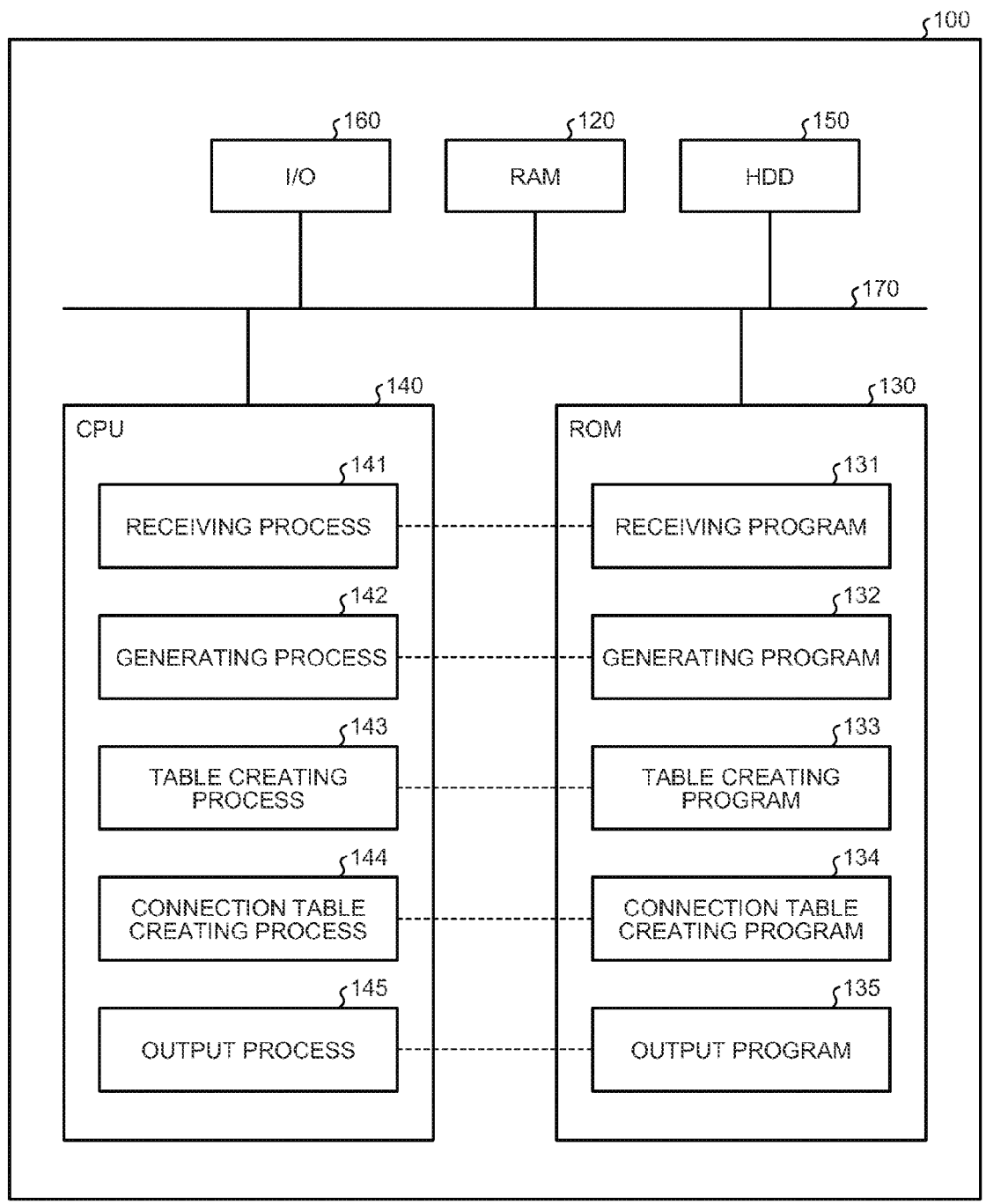
FIG. 17 is a diagram for explaining an example of a computer that executes a controlling program.
Figure 18:
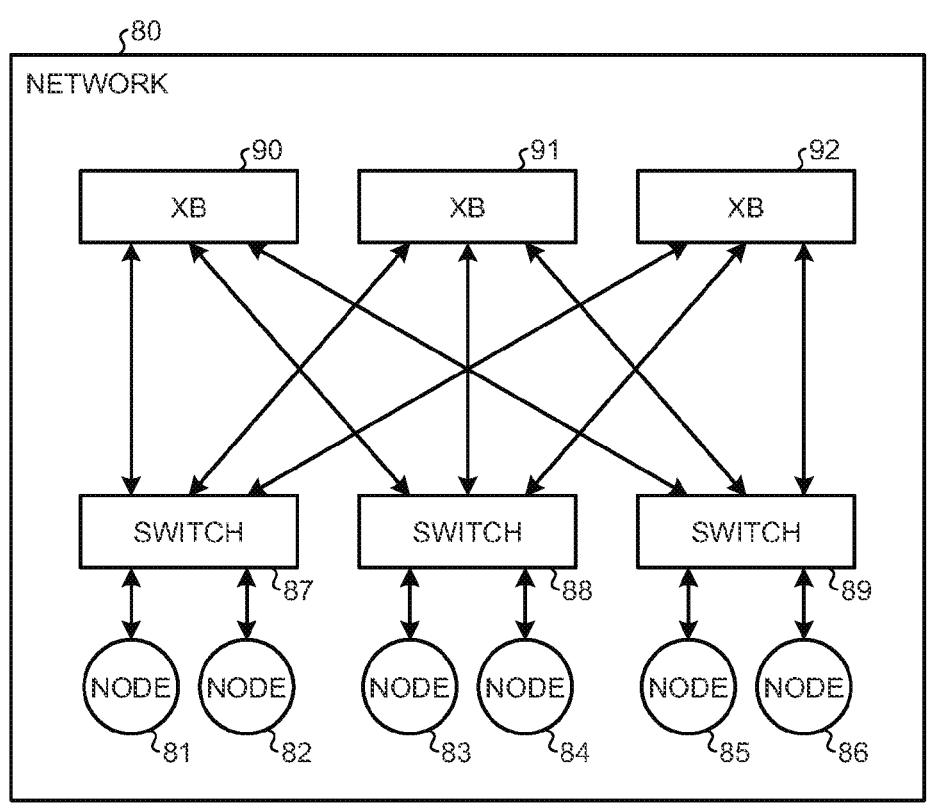
FIG. 18 is a diagram for explaining an example of a non-blocking 3-stage Clos network.

The explanation of the connection table creating device 1 according to the first embodiment and the connection table creating device according to the second embodiment focuses on various processes executed by use of hardware. The embodiments are not limited thereto, and may be realized by executing a program that is prepared in advance on a connection table creating device or a computer. An example of a computer that executes a program having the same functions as the connection table creating device 1 according to the first embodiment is explained below with reference to FIG. 17. FIG. 17 is a diagram for explaining an example of a computer that executes a controlling program.

In a computer 100 illustrated in FIG. 17, a random access memory (RAM) 120, a read only memory (ROM) 130, a hard disk drive (HDD) 150 are connected by a bus 170. Moreover, in the computer 100 of FIG. 17, a central processing unit (CPU) 140 is connected by the bus 170. In addition, the bus 170 is connected to an input/output (I/O) 160 to acquire p and q that is input by the user and to output the created connection table onto a monitor or the like.

The ROM 130 stores therein a receiving program 131, a generating program 132, a table creating program 133, a connection table creating program 134, and an output program 135 in advance. The CPU 140 reads these programs 131 to 135 from the ROM 130 and executes them so that in the example of FIG. 17, the programs 131 and 132 function as a receiving process 141 and a generating process 142. The programs 133 to 135 function as a table creating process 143, a connection table creating process 144, and an output process 145. The processes 141 to 145 have the same functions as the units 2 to 6 illustrated in FIG. 1. The processes 141 to 145 may also be designed to have the functions of the connection table creating device according to the second embodiment.

The controlling program according to the present embodiment can be realized by executing a prepared program on a computer such as a personal computer and a workstation. This program may be distributed by way of a network such as the Internet. This program may also be stored in a computer-readable recording medium such as a hard disc, a flexible disc (FD), a compact disc read only memory (CD-ROM), a magneto optical disc (MO), and a digital versatile disc (DVD). This program may be executed by reading it from a recording medium on a computer.

The problems of an arbitration-involved dynamic routing process can be resolved, and overhead in relation to the arbitration can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it may be understood that the various changes, substitutions, and alterations could be made hereto without departing from the spirit and scope of the invention.

What is claimed is:

1. A connection information generating apparatus that generates connection information that indicates connections between a plurality of first transferring devices and a plurality of second transferring devices, comprising:
   a creating unit that creates an addition table and a multiplication table in a Galois field that has a characteristic of a value based on a number of the second transferring devices that are connected to each of the first transferring devices; and
   a generating unit that generates connection information defining groups of first transferring devices to be connected to each of the second transferring devices, in accordance with the multiplication table and the addition table created by the creating unit.

2. The connection information generating apparatus according to claim 1, wherein:
   the generating unit associates each cell of the multiplication table with the addition table, creates a connection table by storing information, that indicates connections of the first transferring devices and the second transferring devices, into each cell of the addition table that has a same value as the value of the associated cell of the multiplication table, and generates the connection information in accordance with the connection table.

3. The connection information generating apparatus according to claim 2, wherein:
   the creating unit creates the addition table and the multiplication table for the Galois field that has the characteristic of the value that is a power of a prime number when following two conditions are satisfied,
      the number of the second transferring devices that are connected to each of the first transferring devices is one added to the number of the first transferring devices connected to each of the second transferring devices, and
      the number of the first transferring devices connected to each of the second transferring devices is the power of the prime number; and
   the generating unit adds to the connection table a plurality of rows that are brought into one-to-one correspondence with columns of the multiplication table, creates a table by entering the information indicating the connections between the first transferring devices and the second transferring devices into cells corresponding to each column of the multiplication table in each of the added rows, and generates the connection information based on the table.

4. The connection information generating apparatus according to claim 2, wherein:
   the creating unit creates the addition table and the multiplication table for the Galois field that has the characteristic of the value that is a power of a prime number when following two conditions are satisfied
      the number of the second transferring devices that are connected to each of the first transferring devices is one added to the power of the prime number, and
      the number of the first transferring devices connected to each of the second transferring devices is an integral multiple of the power of the prime number; and
   the generating unit creates a second connection table by replicating in the row direction the created connection table for a number of times that is one subtracted from the integer of the integral multiple, and generates the connection information based on the second connection table.

5. The connection information generating apparatus according to claim 2, wherein:
the creating unit creates the addition table and the multiplication table for the Galois field that has the characteristic of the value that is a power of a prime number when following two conditions are satisfied
the number of the second transferring devices that are connected to each of the first transferring devices is same as the number of the first transferring devices connected to each of the second transferring devices, and
the number of the first transferring devices connected to each of the second transferring devices is one added to the power of the prime number; and
the generating unit adds to the connection table a plurality of rows that are brought into one-to-one correspondence with the columns of the multiplication table and a plurality of columns that are brought into one-to-one correspondence with the rows of the multiplication table, enters the information indicating the connections into the cells corresponding to each column of the multiplication table in each of the added rows and the cells corresponding to each row of the multiplication table in each of the added columns, further adds one row and one column, and enters the information indicating the connection into each cell of the added row and column so that the number of the cells where the information indicating the connection is entered becomes a value obtained by adding one to the power of the prime number in every row and every column, creates a table and generates the connection information based on the table.

6. The connection information generating apparatus according to claim 2, wherein:
the creating unit creates the addition table and the multiplication table for the Galois field having the characteristic of the value that is a power of a prime number when following two conditions are satisfied
the number of the second transferring devices connected to each of the first transferring devices is a value of one added to the power of the prime number, and
the number of the first transferring devices connected to each of the second transferring devices is an integral multiple of a value of one added to the power of the prime number; and
the generating unit adds to the connection table a plurality of rows that are brought into one-to-one correspondence with the columns of the multiplication table and a plurality of columns that are brought into one-to-one correspondence with the rows of the multiplication table, enters the information indicating the connections into the cells corresponding to each column of the multiplication table in each of the added rows and the cells corresponding to each row of the multiplication table in each of the added columns, further adds one row and one column, and enters the information indicating the connection into each cell of the added row and column so that the number of the cells where the information indicating the connection is entered becomes a value obtained by adding one to the power of the prime number in every row and every column, to create a table, further creates a second connection table by replicating in the row direction the created table for a number of times that is one subtracted from the integer of the integral multiple, and generates the connection information based on the second connection table.

7. The connection information generating apparatus according to claim 1, wherein the generating unit regards part of ports of each of the second transferring devices as ports of each of the first transferring devices, creates the connection table, and generates the connection information.

8. A controlling method for a connection information generating apparatus that generates connection information that indicates connections between a plurality of first transferring devices and a plurality of second transferring devices, comprising:
creating an addition table and a multiplication table in a Galois field having a characteristic of a value based on a number of the second transferring devices that are connected to each of the first transferring devices; and
generating the connection information that defines groups of first transferring devices connected to each of the second transferring devices based on the multiplication table and the addition table.

9. A non-transitory computer-readable storage medium storing therein a controlling program, the controlling program causing a computer procedure comprising:
creating an addition table and a multiplication table in a Galois field having a characteristic of a value based on a number of the second transferring devices connected to each of the first transferring devices; and
generating the connection information that defines groups of first transferring devices connected to each of the second transferring devices based on the multiplication table and the addition table.

* * * * *